Patented Nov. 29, 1949

2,489,972

UNITED STATES PATENT OFFICE 2,489,972

COPOLYMER OF A VINYL AROMATIC COMPOUND AND AN ALKYLIDINE PHTHALIDE

David T. Mowry and Charles L. Mills, Jr., Dayton, Ohio, assignors to Monsanto Chemical Company, St. Louis, Mo., a corporation of Delaware No Drawing. Application November 5, 1947, Serial No. 784,304

7 Claims. (Cl. 260—88.1)

1

This invention relates to the production of valuable resinous products by the conjoint polymerization of styrene, and similar polymerizable hydrocarbons, with alkylidene phthalides, and to novel copolymers produced thereby. More particularly this invention relates to improved polymers of styrene.

Polystyrene is a valuable and useful article of commerce, but its use is limited by its poor thermal stability. It is the primary object of this invention to provide a modified polymer of styrene with improved physical and chemical characteristics. A further purpose of this invention is to prepare a new copolymer having an unusually high heat distortion point and a high softening temperature.

In accordance with this invention it has been found that if styrene and other similar polymerizable hydrocarbons are subjected to the usual conditions of polymerization in the presence of an alkylidene phthalide, such as methylene phthalide, ethylidene phthalide, and the corresponding propylidene, butylidene and hexylidene derivatives, valuable copolymers are formed. These new copolymers have very desirable physical and chemical properties, and with respect to thermostability are much superior to polystyrene. Although the alkylidene phthalides are not capable of polymerization by themselves, they readily form a conjoint copolymers.

The useful alkylidene phthalides are unsaturated chemical compounds having the structural formula:

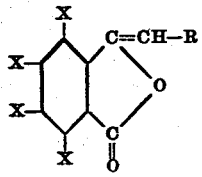

wherein R is a hydrogen atom or an alkyl radical and X is either chlorine or hydrogen. Particularly useful copolymers are made from the alkylidene phthalides wherein R is an alkyl radical having from 1 to 5 carbon atoms.

The alkylidene phthalides may be prepared by the reaction of phthalic anhydride with an anhydride of an aliphatic acid, for example acetic anhydride, propionic anhydride, butyric anhydride or heptoic anhydride according to the equation.

2

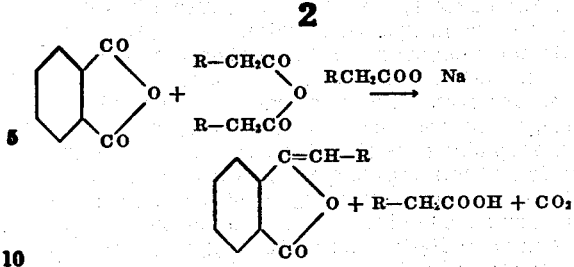

The methylene phthalide cannot be prepared by the same method, but is readily synthesized from phthalideneacetic acid by reaction with quinoline and copper powder. This reaction is conducted at the reflux temperature under a short distillation column. The distillant is then mixed with an equal volume of benzene and washed with dilute hydrochloric acid until neutral and then with water. After the benzene is evaporated the methylene phthalide is recovered as the residue.

In practice of this invention styrene, or similar polymerizable vinyl aromatic compound, for example any of the isomeric styrenes having one or more chlorine, methyl, ethyl or phenyl groups substituted on the benzene rings. Suitable styrenes are the o-, m-, or p-methyl styrenes, the o-, m-, or p-ethyl styrenes, the o-, m-, or p-chlorostyrene; the m- or p-phenylstyrenes, 2,4-dichlorostyrene, 2,5-dichlorostyrene, 2,4,6-trichlorostyrene, the alpha- or beta-vinyl naphthalene and chloro-p-methylstyrene. The useful styrenes may be represented by the structural formula:

$$CH_2=CH-R-X_y$$

wherein R is an aromatic hydrocarbon radical, X is a radical of the group consisting of chlorine, methyl, ethyl or phenyl, and $y$ is a small whole number from 0 to 3 inclusive.

Terpolymers of any of the above actively polymerizables monomers with the alkylidene phthalides and any other of the above styrenes or less polymerizable styrenes, such as alpha, paradimethyl styrene, alpha-methyl styrene and alpha-chlorostyrene are also contemplated.

Polymerization in accordance with this invention involves mixing styrene, or other polymerizable vinyl substituted aromatic hydrocarbon, with from 2 to 50 per cent by weight of one or more of the above alkylidene phthalides and heating to effect a reaction. Compositions of unusual, desirable physical properties are prepared by the copolymerization of from 5 percent to 30 percent of alkylidene phthalides and from 70 percent to 90 percent of the vinyl substituted aromatic hydrocarbon. It is generally desirable to use mass polymerization methods, which are usually conducted by heating the mixed monomers in the presence of from 0.005 to 1.0 percent by weight of an oxygen producing substance, such as benzoyl peroxide, hydrogen peroxide, acetyl peroxide, sodium perborate, or other peroxide or persalt having in its structure a peroxide linkage (—O—O—). The rate of copolymerization will depend upon the temperature and upon the quantity and particular nature of catalyst used. Temperatures between 50° C. and 200° C. are used. Generally from 2 to 200 hours are required to complete the reaction and produce a clear, transparent solid substance, but frequently longer periods of time are used. The solid polymer is then ground to particles of the desired size, and may be used in the manufacture of transparent molded articles or for any other purpose for which polystyrene is customarily used.

Emulsion copolymers may be prepared by heating the mixed monomers in an aqueous medium, using stirring, or other agitation means, to maintain the monomers in a finely divided suspension in the water. Usually an emulsifying agent is used, for example a rosin soap, sodium alkyl sulfate, triethanol amine, sulfonated hydrocarbons, water soluble salts of high molecular weight fatty acids and mixtures thereof obtained by saponification of animal and vegetable oils, and other compounds containing both hydrophobic and hydrophilic radicals. When the polymerization is complete the solid polymer is separated from the aqueous phase and unreacted monomer by filtration. In some cases it may be necessary to precipitate the emulsion by destroying the effectiveness of the emulsifier, for example by acidifying the emulsion. The copolymer in finely divided form as obtained by the filtration operation may be used directly as a molding powder.

Further details of the preparation of the new copolymers are set forth in the following detailed examples.

Example 1

Several different proportions of styrene and ethylidene phthalide were polymerized by mixing the monomers in glass reaction vessels and heating for 72 hours at 80° C., then 72 hours at 100° C., 72 hours at 135° C., and finally 24 hours at 175° C. The polymerization was catalyzed by the use of 0.1 percent of t-butyl hydroperoxide, by weight based on the monomer charged. All traces of unreacted monomers were removed by dissolving the copolymers in dioxane and reprecipitating by the addition of ethanol. The following table demonstrates the thermal stability of the purified copolymers.

Percent-weight of monomer

| Styrene | Ethylidene Phthalide | Softening Point | Melting Point | Decomposition Point |
|---|---|---|---|---|
|  |  | Degrees | Degrees | Degree |
| 99 | 1 | 120 | 220 | 250 |
| 97 | 3 | 125 | 200 | 290 |
| 95 | 5 | 130 | 195 | 250 |
| 90 | 10 | 135 | 205 | 250 |
| 80 | 20 | 178 | 225 | 225 |
| 60 | 40 | 178 | 225 | 225 |
| 50 | 50 | 188 | 230 | 230 |

A comparison of the thermal stability of the various copolymers was made with polystyrene prepared in identical manner. Favorable improvements were demonstrated by all samples.

Example 2

Mass polymerization of 90 percent and 95 percent of styrene and 10 percent and 5 percent respectively of ethylidene phthalide were also prepared by heating the mixed monomers 72 hours at 100° C., 120 hours at 135° C., and 24 hours at 175° C., in the presence of 0.1 percent of t-butyl hydroperoxide. A comparable sample of styrene was run under identical conditions to demonstrate the benefit achieved by the copolymerization. The following table demonstrates the improvement in ASTM heat distortion points.

| Styrene | Ethylidene Phthalide | Heat Distortion |
|---|---|---|
| 100 | — | 93.7° |
| 95 | 5 | 101.5° |
| 90 | 10 | 107.5° |

Example 3

Emulsion polymers were prepared by polymerization under identical conditions 95 percent and 90 percent by weight of styrene and 5 percent and 10 percent respectively of ethylidene phthalide. The mixed monomers were added gradually with vigorous agitation to two parts by weight of water for each part of mixed monomers. The water contained 0.2 percent by weight (based on the monomer) of a mixture of alkylaryl sodium sulfonate having an average of about 26 carbon atoms per molecule. The reaction was catalyzed with 0.1 percent by weight of potassium sulfate. The monomers were gradually added over a period of four and one-half hours while maintaining the reaction temperature at reflux (93–95° C.). The resulting polymer was washed with water and the ASTM heat distortion points determined. The 95–5 polymer was found to have a heat distortion of 100.5° C. and the 90–10 was found to be 112° C., both representing a substantial improvement over polystyrene prepared under identical conditions.

Example 4

Mass polymers of styrene and hexylidene phthalide were prepared in the ratio of 95–5, 90–10, 80–20, and 70–30, using 0.1 percent by weight of the monomer of benzoyl peroxide and a polymerization schedule of 48 hours at 80° C., 72 hours at 135° C., and 24 hours at 175° C. In all cases clear, colorless and hard copolymers were obtained.

Example 5

A copolymer of 90 percent styrene and 10 percent ethylidene phthalide was prepared using 0.1 percent by weight of benzoyl peroxide. The polymer was heated for 168 hours at 100° C., and 168 hours at 135° C. A sample of styrene was polymerized under identical conditions as a control. The copolymer was found to have a melting point of 230° C. and a decomposition point of 260° C. Whereas, the polystyrene prepared under identical conditions had a melting point of 215° C. and decomposed at 230° C.

Example 6

Mass copolymers of styrene and propylidene phthalide were prepared in the proportions of 95–5, 80–20, 70–30, using 0.1 percent by weight of benzoyl peroxide. After heating for five days at 100° C. and 28 days at 135° C., hard, transparent copolymers were obtained.

Example 7

Mass copolymers of styrene and 4,5,6,7-tetrachloro-3-ethylidene phthalide were prepared in the proportions 95-5, 90-10, and 80-20 using 0.1 percent by weight of benzoyl peroxide and a polymerization schedule of 96 hours at 80° C., 48 hours at 135° C., and 24 hours at 175° C. In all cases the copolymers were hard, transparent solids and had better thermal stability than a sample of polystyrene run under identical conditions.

Although the invention has been described with respect to specific embodiments thereof, it is not intended that the details set forth shall be construed as limitations upon the scope except to the extent incorporated in the following claims.

We claim:

1. A copolymer of (A) a from 50 to 98 percent by weight of compound having the structure:

wherein R is an aromatic hydrocarbon group, X is a radical of the group consisting of methyl, ethyl, phenyl, and chlorine, and $y$ is a small whole number from 0 to 3 inclusive, and (B) a from 50 to 20 percent compound having the structure:

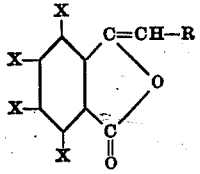

wherein R is a radical of the group consisting of hydrogen and alkyl and X is an atom of the group consisting of hydrogen and chlorine.

2. A copolymer of 70 percent to 95 percent of styrene and from 5 percent to 30 percent of a compound having the structure:

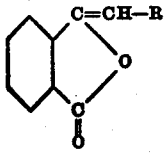

wherein R is an alkyl group having from 1 to 5 carbon atoms.

3. A copolymer of 70 percent to 95 percent styrene and from 5 percent to 30 percent of ethylidene phthalide.

4. A copolymer of 70 percent to 95 percent styrene and from 5 percent to 30 percent of propylidene phthalide.

5. A copolymer of 70 percent to 95 percent of styrene and from 5 percent to 30 percent of hexylidene phthalide.

6. A method of preparing a copolymer which comprises mixing a from 50 to 98 percent by weight of compound of the structure:

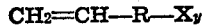

wherein R is an aromatic hydrocarbon radical, X is a radical of the group consisting of methyl, ethyl, phenyl and chlorine, and $y$ is a small whole number from 0 to 3 inclusive, and a from 50 to 20 percent compound of the structure:

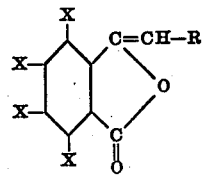

wherein R is a radical of the group consisting of hydrogen and alkyl and X is an atom of the group consisting of hydrogen and chlorine, heating the mixed monomers in the presence of a peroxy catalyst at 50 to 200° C., and recovering the resultant copolymer.

7. The method defined by claim 6 wherein the copolymers are prepared in aqueous medium with vigorous agitation and in the presence of an emulsifying agent.

DAVID T. MOWRY.
CHARLES L. MILLS, Jr.

No references cited.